(12) United States Patent
Schill

(10) Patent No.: US 10,883,661 B2
(45) Date of Patent: Jan. 5, 2021

(54) DEVICE AND METHOD FOR SAFETY INSTRUMENTED CONTROL OF A MACHINE

(71) Applicant: MAJA-Maschinenfabrik Hermann Schill GmbH, Kehl-Goldscheuer (DE)

(72) Inventor: Joachim Schill, Kehl (DE)

(73) Assignee: MAJA-MASCHINENFABRIK HERMANN SCHILL GMBH, Kehl-Goldscheuer (DE)

( * ) Notice: Subject to any disclaimer, the term of this patent is extended or adjusted under 35 U.S.C. 154(b) by 134 days.

(21) Appl. No.: 16/086,561

(22) PCT Filed: May 8, 2017

(86) PCT No.: PCT/DE2017/100391
§ 371 (c)(1),
(2) Date: Sep. 19, 2018

(87) PCT Pub. No.: WO2017/190742
PCT Pub. Date: Nov. 9, 2017

(65) Prior Publication Data
US 2019/0120428 A1    Apr. 25, 2019

(30) Foreign Application Priority Data

May 6, 2016   (DE) .................. 10 2016 207 861

(51) Int. Cl.
*F16P 3/18*   (2006.01)
*A22B 5/16*   (2006.01)
(Continued)

(52) U.S. Cl.
CPC ............ *F16P 3/18* (2013.01); *A22B 5/166* (2013.01); *A22C 17/12* (2013.01); *F16P 3/12* (2013.01)

(58) Field of Classification Search
CPC ........ F16P 3/00; F16P 3/12; F16P 3/18; F16P 3/20; A22B 5/166; A22C 17/12; Y10S 83/01
(Continued)

(56) References Cited

U.S. PATENT DOCUMENTS

| | | | |
|---|---|---|---|
| 4,965,909 A | 10/1990 | McCullough et al. | |
| 5,035,654 A * | 7/1991 | Endo .................. | H01R 13/642 439/679 |

(Continued)

FOREIGN PATENT DOCUMENTS

| | | |
|---|---|---|
| EP | 0 362 937 | 4/1990 |
| EP | 0 445 860 | 9/1991 |

OTHER PUBLICATIONS

Search Report, German Patent and Trademark Office, Priority Application DE 10 2016207861.5, dated Apr. 25, 2017.
(Continued)

*Primary Examiner* — Richard M Lorence
(74) *Attorney, Agent, or Firm* — Shlesinger, Arkwright & Garvey LLP

(57) ABSTRACT

A device and a method for safety instrumented control of a machine, wherein the machine is equipped with an electric drive, is operated by a person and has at least one metal component capable of causing injury in the event of a mechanical interaction with said person. The device is equipped with a left-hand and right-hand conductive glove in the form of an under-glove, a left-hand and right-hand insulating glove in the form of an over-glove, a control device which controls the electric drive of the machine and to which the conductive gloves can be connected, and a resistance test device of the control device which compares the resistance between the left-hand and right-hand conductive gloves to a predetermined minimum resistance and a predetermined maximum resistance and prevents the drive (Continued)

from being switched on if the detected resistance is less than the minimum resistance or greater than the maximum resistance.

25 Claims, 1 Drawing Sheet

(51) Int. Cl.
*A22C 17/12* (2006.01)
*F16P 3/12* (2006.01)

(58) Field of Classification Search
USPC .............. 192/129 A, 131 R; 307/326, 328; 83/DIG. 1
See application file for complete search history.

(56) References Cited

U.S. PATENT DOCUMENTS

| | | | | |
|---|---|---|---|---|
| 5,057,965 A | * | 10/1991 | Wilson | G01R 31/54 361/212 |
| 5,198,702 A | | 3/1993 | McCullough et al. | |
| 5,272,946 A | | 12/1993 | McCullough et al. | |
| 5,315,289 A | | 5/1994 | Fuller et al. | |
| 7,166,354 B2 | * | 1/2007 | Tsunashima | C08K 9/02 427/123 |
| 2002/0017178 A1 | * | 2/2002 | Gass | F16P 3/12 83/58 |
| 2004/0244091 A1 | | 12/2004 | Parren | |

OTHER PUBLICATIONS

The International Bureau of WIPO, International Preliminary Report on Patentability, PCT/DE2017/100391, dated Nov. 6, 2018.

* cited by examiner

DEVICE AND METHOD FOR SAFETY INSTRUMENTED CONTROL OF A MACHINE

RELATED APPLICATIONS

This is a national stage of PCT/DE2017/100391, filed May 8, 2017, which claims priority from Germany 10 2016 207 861.5, filed May 6, 2016, both of which are herein incorporated by reference.

FIELD OF THE INVENTION

The invention derives from a device and a method for safety instrumented control of a machine, wherein said machine is equipped with an electric drive, is operated by a person and has a metal component capable of causing injury in the event of a mechanical interaction with said person.

BACKGROUND OF THE INVENTION

On machines that are operated by a person and that have a tool or another component with which the person may come into contact during operation of the machine, there is the fundamental risk that the person may be injured. This is particularly true if the person processes an object with the machine that is introduced to the machine by hand and is moved by hand relative to a tool of the machine during processing. The hands of the person may come into contact with the tool and be injured. Gloves can be worn to reduce the risk of injury. Although the risk of injury can be reduced through the use of gloves, it is not possible to fully prevent injuries.

This type of machines includes, for example, flaying and skinning machines with which the skin or rind on pieces of meat are removed by means of a knife, as well as membrane skinning machines. Machines of this kind are equipped with a roller, the rotation of which is controlled by an electric drive. The rotating roller pulls a piece of meat toward a knife positioned at a fixed location on the machine and moves the piece of meat relative to this knife. If the piece of meat is round or has an irregular shape, it must be guided by a person during the flaying and skinning. In the process, the person could be injured on the knife. There is also the danger of the roller catching the person's hand and pressing it against the knife.

The persons can wear gloves when working on the machine; these gloves comprise a conductive under-glove and an insulating over-glove. If the insulating over-glove is damaged while working on the machine, e.g. is cut by a tool on the machine, the conducting under-glove makes electrical contact with a metallic component of the machine. This contact can be detected and the drive of the machine can be switched off. The fact that the person is not required to wear the gloves is a disadvantage.

SUMMARY OF THE INVENTION

The invention is based on the task of providing a device and a method for safety instrumented control of a machine of this kind that only enable switching on of the machine's drive if the person is wearing conductive gloves and the gloves have a conducting connection to a control device as prescribed.

This task is solved by a device and by a method according to the present invention. The device is characterised in that it is equipped with a left-hand and right-hand conductive glove, a left-hand and right-hand insulating glove, a control device, a conducting connection between the left-hand conductive glove and the control device, a conducting connection between the right-hand glove and the control device and a resistance test device of the control device.

The left-hand and right-hand conductive gloves conduct the electricity here. They are to be worn by a person who is operating the machine and who is working on the machine such that the gloves make contact with the skin of the person's hands. The conductive gloves can also be referred to as under-gloves.

Over the conductive gloves, the person must wear a left-hand and right-hand insulating glove. The insulating gloves comprise an electrical insulator. The insulating gloves can also be referred to as over-gloves.

The protective gloves thus exhibit a combination of a pair of conductive under-gloves and a pair of insulating over-gloves.

The control device controls the electric drive. The conductive gloves are connected to the control device via conducting connections. Each of the two conductive gloves is coupled to the control device via a separate connection. For the left-hand conductive glove there is a left-hand conducting connection and for the right-hand conductive glove there is a right-hand conducting connection. The control device is equipped with a voltage source to which the left-hand and right-hand conductive gloves are connected. If the person wears the left-hand and right-hand conductive gloves such that the gloves envelop the person's hands and the gloves make contact with the person's skin, a current flows from the control device to the left-hand conductive glove, through the person, to the right-hand conductive glove and from there back to the control device. The direction of the current can be reversed. The voltage is selected such that the current is low, for example in the microampere range, so that the person is not affected by the current.

If the person wears the insulating gloves over the conductive gloves and makes contact with the machine, in particular with a metallic component of the machine, with hands gloved in this manner, no current flows from the conductive gloves to the metallic component as the insulating gloves prevent the current flow. The current flow from the left-hand to the right-hand conductive glove through the person's body is not impaired or suppressed by the insulating gloves.

The control device has an operating condition in which it supplies the electric drive with power and monitors the voltage between the right-hand conductive glove and left-hand conductive glove. If the voltage drop over the left-hand or right-hand conductive glove changes in this operating condition, the control device switches off the electric drive or reverses the direction of movement of the electric drive. This type of voltage drop occurs if a current flows from the left-hand or right-hand conductive glove to a metallic component of the machine. It is therefore assumed that in the event of a voltage drop over the left-hand or right-hand conductive glove there is damage to the left-hand or right-hand insulating glove. This can be triggered in particular if the person has interacted with a tool or a component of the machine and if there is a risk of injury. For this reason, the control device switches off the drive of the machine. As an alternative or in addition, the control device can reverse the direction of movement of the drive. This is true on machines with rotationally driven rollers, for example. Reversing the direction of movement of the drive results in any section of the glove that was pulled into the roller being released.

Before the control device activates the operating condition, in a starting phase a resistance test device of the control device is used to detect the resistance between the left-hand conductive glove with a conducting connection to the control device and the right-hand conductive glove with a conducting connection to the control device and to compare this with a predetermined minimum resistance and a predetermined maximum resistance. The minimum resistance here is greater than 0Ω and less than the typical body resistance of a person. The body resistance of a person is the resistance that is active if an electrical current flows through a person's body when voltage is applied to that person's body. This body resistance is typically between 17 and 30 kΩ. It differs from person to person and may also lie above or below this specified range.

If the resistance determined by the resistance test device between the left-hand conductive glove with a conducting connection to the control device and the right-hand conductive glove with a conducting connection to the control device is less than the minimum resistance, it can be concluded that one of the following causes is present:
- the two conductive gloves are making contact such that there is an electrical contact between the two gloves and a current is flowing directly from one conductive glove to the other without being conducted through the person's body, e.g. because the person placed one conductive glove on top of the other without wearing them on their hands,
- the conducting connections between the conductive gloves and the control device have been bypassed,
- there is a cross-circuit or short-circuit between the conducting connections of the conductive gloves.

From the fact that the resistance between the left-hand conductive glove and right-hand conductive glove is less than the minimum resistance, it can be concluded that either the person is not wearing the conductive gloves in the prescribed manner or that the conducting connection between the conductive gloves and the control device is impaired.

The maximum resistance is predetermined such that it is considerably higher than the typical body resistance. If the resistance determined by the resistance test device between the left-hand conductive glove with a conducting connection to the control device and the right-hand conductive glove with a conducting connection to the control device is greater than the predetermined maximum resistance, it can be concluded that one of the following causes is present:
- the conductive gloves are not being worn by the person,
- the conducting connection between the left-hand conductive glove and the control device and/or between the right-hand conductive glove and the control device is interrupted, for example due to a cable break or because at least one of the two conductive gloves is not connected correctly to the control device.

From the fact that the resistance between the left-hand conductive glove and right-hand conductive glove is greater than the predetermined maximum resistance, it can be concluded that either the person is not wearing the conductive gloves in the prescribed manner or that the conducting connection between the conductive gloves and the control device is interrupted.

If it is determined that the resistance between the left-hand conductive glove and the right-hand conductive glove is less than the predetermined minimum resistance or greater than the predetermined maximum resistance, for safety reasons the control device is prevented from switching over into the operating condition. The drive of the machine cannot be switched on. The person can perform the check again. The operating condition is only activated and the switching on of the drive enabled when the resistance between the left-hand and right-hand conductive gloves is between the minimum resistance and the maximum resistance.

The check of the resistance between the left-hand and right-hand conductive gloves is not only performed before the activation of the operating condition, but also advantageously while the control device is in the operating condition and the drive is supplied with power. A corresponding check can be performed periodically each passage of a certain time interval, for example. If it is determined during the operating condition that the resistance is outside the interval predetermined by the minimum resistance and the maximum resistance, the control device interrupts the power supply of the drive. The drive is switched off and the operating condition is terminated. An activation of the operating condition only becomes possible again if the resistance between the left-hand and right-hand conductive gloves is within the predetermined interval.

The device according to the invention and the method according to the invention thus solve the task of it only being possible to switch on the machine's drive if the person is wearing the conductive gloves on his hands in the prescribed manner and the conducting connection between the conductive gloves and the control device is ensured as prescribed.

According to an advantageous embodiment of the invention, the resistance test device of the control device also has a glove test function in addition to the check of the resistance between the left-hand and right-hand conductive gloves. This involves checking whether the conductivity of the conductive gloves is present in the prescribed and required manner. A so-called glove maximum resistance is predetermined for this purpose. This glove maximum resistance is predetermined in such a manner that it is greater than the resistance between a left-hand or right-hand conductive glove and a metallic component of the machine if the glove is equipped with the prescribed and correct conductivity, is connected to the control device and makes contact with a metallic component. The following steps are carried out before the person puts on the insulating gloves and before the control device activates the operating condition:
- The control device prompts the person to make contact with a metallic part of the machine with the left hand, which is equipped with the left-hand conductive glove, whereby the left-hand conductive glove is connected to the control device. The resistance between the left-hand conductive glove and the metallic part is compared with the predetermined glove maximum resistance.
- The control device prompts the person to make contact with a metallic part of the machine with the right hand, which is equipped with the right-hand conductive glove, whereby the right-hand conductive glove is connected to the control device. The resistance between the right-hand conductive glove and the metallic part is compared with the predetermined glove maximum resistance.

If the resistance is above the predetermined glove maximum resistance for one or both of the gloves, it is assumed that the conductivity of one or both gloves is not ensured. This may be the case, for example, if a conductive coating of the gloves is damaged or impaired due to frequent or improper washing. In the event that the resistance is greater than a predetermined glove maximum resistance on one or both gloves, the control device prevents the activation of the operating condition. The drive of the machine cannot be switched on.

According to a further advantageous embodiment of the invention, the left-hand conducting connection between the left-hand conductive glove and the control device comprises a first cable with a first plug. The first plug can be inserted in a first socket of the control device. In addition, the right-hand conducting connection comprises a second cable with a second plug that can be inserted in a second socket of the control device. The first plug differs from the second plug here. The first socket also differs from the second socket. The plugs and sockets may differ in terms of shape and/or size. As a result, the first plug can only be inserted in the first socket and the second plug can only be inserted in the second socket. This makes it possible for the control device to detect on which conductive glove or which associated connection there is a deviation of the resistance from the predetermined range, where applicable.

According to a further advantageous embodiment of the invention, the left-hand conducting connection and the left-hand conductive glove are equipped with components of a VELCRO hook and loop fastener so that the glove can be connected to conducting connection via a VELCRO hook and loop fastener. The right-hand conducting connection and the right-hand conductive glove are accordingly equipped with a VELCRO hook and loop fastener over which the right-hand conducting connection is connected to the right-hand conductive glove. The VELCRO hook and loop fastener enables simple and fast attachment and release of the conducting connections to the gloves. The VELCRO hook and loop fastener is preferably located on the section of the gloves intended for the back of the hand.

According to a further advantageous embodiment of the invention, the control device is equipped with a voltage source that supplies the left-hand and right-hand conductive gloves with direct current.

According to a further advantageous embodiment of the invention, the control device is designed to cycle the direct current to alternately supply the left-hand and right-hand conductive gloves with power. In the process, the time intervals in which the right-hand and left-hand gloves are supplied with power can either overlap or not. In the event of overlapping, both gloves are supplied with power at certain periods and only one of the two gloves is supplied at certain periods. If the time intervals do not overlap, only one of the two gloves is supplied with power at any time.

According to a further advantageous embodiment of the invention, the control device is designed to cycle the direct current to supply the left-hand and right-hand conductive gloves with power at the same time.

According to a further advantageous embodiment of the invention, the control device is equipped with a safety transformer. The safety transformer is designed with a primary-side motor protection switch for the primary-side short-circuit and with a secondary-side overload protection.

According to a further advantageous embodiment of the invention, the control device is built redundantly.

According to a further advantageous embodiment of the invention, the left-hand and right-hand conductive gloves are made of a synthetic fibre and have a coating made of conductive metal. The synthetic fibre may for example be a polyamide fibre. The metal may be silver, for example.

As an alternative to a metallic coating, metal fibres can also be integrated into the synthetic fibres of the glove during production. Gloves reinforced with metal fibres in this manner do not meet the occupational health and safety requirements in certain countries. With flaying and skinning machines, metal-fibre reinforced gloves are not permitted as per the EU standard EN 12355.

According to a further advantageous embodiment of the invention, the control device is equipped with a visual display device on which the operating condition and/or the faults detected by the control device are displayed. The person is thus informed of any detected faults and the type of faults. Furthermore, the person can identify whether the control device has activated the operating condition. In addition to this, the display device can issue instructions to the person to carry out certain actions, such as putting on the left-hand and right-hand conductive gloves, to make contact with a metallic component on the machine or to put on the insulating gloves.

According to a further advantageous embodiment of the invention, the device includes shoes for the person, whereby the shoes are at least equipped with an electrical insulator on the sole. Wearing these shoes guarantees that a current that flows from the control device to the left-hand or right-hand conductive glove and into the person's body through the person's skin cannot flow off to earth over the person's shoes. With this type of current flow, it would not be possible to check the resistances as described above.

According to a further advantageous embodiment of the invention, the device includes a jacket for the person, whereby the left-hand and right-hand conducting connections are at least partially integrated into the jacket. This type of jacket facilitates connection of the left-hand and right-hand conductive gloves to the control device.

The method according to the invention is characterised in that the following process steps are performed before the operating condition of the control device is activated:

The person is prompted to put on one left-hand and one right-hand conductive glove such that the gloves make contact with the skin of the person's hands.

The person is prompted to connect the left-hand conductive glove to the control device, which controls the electric drive of the machine.

The person is prompted to connect the right-hand conductive glove to the control drive.

The resistance between the left-hand conductive glove with a conducting connection to the control device and the right-hand conductive glove with a conducting connection to the control device is detected and compared with a predetermined minimum resistance and a predetermined maximum resistance.

The operating condition is now activated by the control device only if the detected resistance is greater than the minimum resistance and less than the maximum resistance.

If the specified requirement is met, the person is prompted to put on the isolating gloves over the left-hand conductive gloves.

The contactors for the drive of the machine are the advantageously checked. If the machine is equipped with a rotationally driven roller, for example, the forward and backward motion of the roller are checked. The roller is rotationally driven first in one direction, then the other. Only then is the machine truly ready for operation. The person detects that the device is ready for operation based on the rotation of the roller.

In the operating condition, the electric drive of the machine is supplied with power. The voltage between the right-hand conductive glove and left-hand conductive glove is monitored. If there is a voltage drop over the left-hand or right-hand conductive glove, the electric drive is switched off by the control device or the direction of movement of the electric drive is reversed.

According to a further advantageous embodiment of the invention, a flaying and skinning machine is equipped with the device according to the invention. As a result, safety instrumented control and monitoring of the flaying and skinning machine are guaranteed.

According to a further advantageous embodiment of the invention, a membrane skinning machine is equipped with a device according to the invention.

According to a further advantageous embodiment of the invention, the method according to the invention for the safety instrumented control of a flaying and skinning machine is carried out.

According to a further advantageous embodiment of the invention, the method according to the invention for the safety instrumented control of a membrane skinning machine is carried out.

Further advantages and advantageous embodiments of the invention can be obtained from the following description, the drawing and the claims.

BRIEF DESCRIPTION OF THE DRAWING

The drawing shows a model embodiment of the invention which is described in more detail below. Illustration:

DESCRIPTION OF THE MODEL EMBODIMENT

Figure 1:
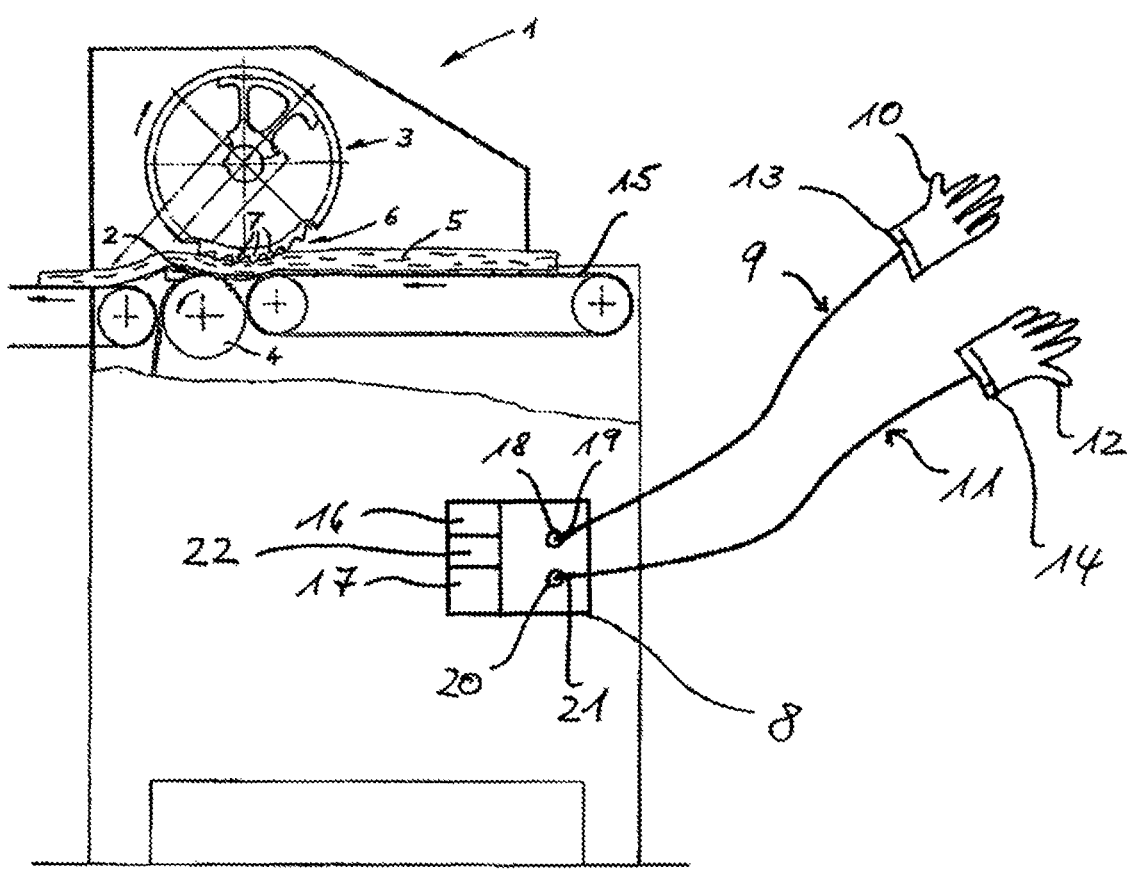
FIG. 1 Device for the safety instrumented control of a machine equipped with a knife.

FIG. 1 shows a device for the safety instrumented control of a machine 1 equipped with a knife 2. The machine 1 has not only a knife 2 made of metal, but also a pressure roller 3 and a draw roller 4 which move a piece of meat to be processed relative to the knife 2. The knife cuts off a layer of the piece of meat. This layer is on the side facing down on which the piece of meat is lying on conveyor belt 15. The pressure roller is equipped with a profile 6 with teeth 7. The machine is equipped with an electric drive not shown in the drawing which rotationally drives the draw roller 4. The rotation of the draw roller 4 serves to pull the pieces of meat 5 across the knife 2. Machine 1 can be a flaying and skinning machine or a membrane skinning machine.

The device for safety instrumented control of the machine 1 is integrated into the machine 1 and equipped with a control device 8, a left-hand glove 10 and a right-hand glove 12, a left-hand conducting connection 9 and a right-hand conducting connection 11. The control device 8 controls the electric drive of the machine 1. The left-hand glove 10 comprises a left-hand conductive glove and an insulating glove to be worn over this. The right-hand glove 12 accordingly comprises a right-hand conductive glove and an insulating glove to be worn over this. The left-hand conducting connection 9 connects the left-hand conductive glove to the control device 8. The right-hand conducting connection 11 connects the right-hand conductive glove to the control device 8. The control device 8 is equipped with a resistance test device 16 and a voltage source 17. The resistance test device 16 checks the resistance between the left-hand conductive glove and the right-hand conductive glove. The voltage source 17 supplies the left-hand conductive glove and the right-hand conductive glove with direct current.

The left-hand conducting connection 9 is designed as a first cable that is equipped with a plug on the end facing toward the control device 8. This plug is called the first plug 19. The control device 8 has a first socket 18 for the first plug 19. The right-hand conducting connection 11 is designed as a second cable that is equipped with a plug on the end facing toward the control device 8. This plug is called the second plug 21. The control device 8 has a second socket 20 for the second plug 21. The first plug 19 differs from the second plug 21 here. In addition, the first socket 18 differs from the second socket 20. The first plug 19 only fits in the first socket 18, not in the second socket 20. The second plug 21 only fits in the second socket 20, not in the first socket 18.

The left-hand conductive glove of the left-hand glove 10 is equipped with a VELCRO hook and loop fastener 13 over which the left-hand conducting connection 9 is connected to the left-hand conductive glove. The right-hand conductive glove of the right-hand glove 12 is equipped with a VEL-CRO hook and loop fastener 14 over which the right-hand conducting connection 11 is connected to the right-hand conductive glove.

Furthermore, the control device 8 is equipped with a visual display device 22 with which the operating condition of the control device 8 and any detected faults are displayed.

A person not shown in the drawing who places pieces of meat 5 on the conveyor belt 15 may reach all the way into the area of the knife with his hand. In order to protect this person, he wears a left-hand and right-hand glove 10, 12 as described above. Using the device for safety instrumented control of the machine, it is possible to monitor whether the person is wearing the gloves and whether the device is functioning correctly. The draw roller 4 is only driven if the device for safety instrumented control does not detect any faults.

All features of the invention can be material to the invention both individually and in any combination.

The invention claimed is:

1. A device for safety instrumented control of a machine, which is equipped with an electric drive, which is operated by a person, and which has at least one metal component capable of causing injury in the event of a mechanical interaction with the person, the device comprising:
a left-hand conductive glove and a right-hand conductive glove, which conduct electricity, and which are to be worn by the person such that the gloves make contact with the skin of the person's hands,
a left-hand insulating glove and a right-hand insulating glove, which comprise an electrical insulator, and which are to be worn by the person over the conductive gloves;
a control device, which controls the electric drive of the machine;
a left-hand conducting connection between the left-hand conductive glove and the control device;
a right-hand conducting connection between the right-hand conductive glove and the control device;
the control device including an operating condition wherein the control device supplies the electric drive with power and monitors a voltage between the right-hand conductive glove and the left-hand conductive glove, and switches off the electric drive or reverses the direction of movement of the electric drive if the voltage between the left-hand conductive glove and the right-hand conductive glove changes;
a resistance test device of the control device, which detects a first resistance between the left-hand conductive glove and the right-hand conductive glove and compares the first resistance with a predetermined minimum resistance and a predetermined maximum resistance, wherein the predetermined minimum resistance is greater than 0Ω and less than a typical body resistance of a person, wherein the predetermined maximum resistance is higher than the typical body resistance of a person, and wherein the activation of the operating condition is prevented if the first resistance is below the predetermined minimum resistance or greater than the predetermined maximum resistance or if the operating condition is already present terminates the operating condition if the first resistance is less than the minimum resistance or greater than the maximum resistance.

2. Device according to claim 1, wherein the resistance test device of the control device has a glove test function,
wherein a second resistance between the left-hand conductive glove and a metallic part of the machine is compared with a predetermined glove maximum resistance if the person is wearing the left-hand glove and uses this gloved left hand to make contact with the metallic part;
wherein a third resistance between the right-hand conductive glove and the metallic part of the machine is compared with a predetermined glove maximum resistance if the person is wearing the right-hand glove and uses this gloved right hand to make contact with the metallic part;
and wherein the activation of the operating condition is prevented if the second or third resistance is greater than the predetermined glove maximum resistance.

3. Device according to claim 1, wherein the left-hand conducting connection is a first cable with a first plug which can be inserted in a first socket of the control device, that the right-hand conducting connection is a second cable with a second plug which can be inserted in a second socket of the control device, and that the first plug differs from the second plug and the first socket differs from the second socket such that the first plug can only be inserted in the first socket and the second plug can only be inserted in the second socket.

4. Device according to claim 1, wherein the left-hand conducting connection and the left-hand conductive glove are equipped with a VELCRO hook and loop fastener over which the left-hand conducting connection is connected to the left-hand conductive glove, and that the right-hand conducting connection and the right-hand conductive glove are equipped with a VELCRO hook and loop fastener over which the right-hand conducting connection is connected to the right-hand conductive glove.

5. Device according to claim 1, wherein the control device is equipped with a voltage source that supplies the left-hand and right-hand conductive gloves with direct current.

6. Device according to claim 5, wherein the control device is designed to cycle the direct current to alternately supply the left-hand and right-hand conductive gloves with power.

7. Device according to claim 5, wherein the control device is designed to cycle the direct current to supply the left-hand and right-hand conductive gloves with power at the same time.

8. Device according to claim 1, wherein the control device is equipped with a safety transformer.

9. Device according to claim 1, wherein the control device is built redundantly.

10. Device according to claim 1, wherein the left-hand and right-hand conductive gloves are made of a synthetic fibre and have a coating made of conductive metal.

11. Device according to claim 1, wherein the control device is equipped with a visual display device on which faults detected by the control device are displayed.

12. Device according to claim 1, and further comprising shoes for the person, and that the shoes are equipped with respective electrical insulator soles.

13. Device according to claim 1, and further comprising a jacket for the person, and that the left-hand and right-hand conducting connections are integrated into the jacket.

14. Method for the safety instrumented control of a machine which is equipped with an electric drive, which is operated by a person, and which has at least one metal component capable of causing injury in the event of a mechanical interaction with said person, the method comprising the steps of:
equipping the person with a left-hand glove and a right-hand conductive glove which conduct the electricity, and which are to be worn by the person such that the gloves make contact with the skin of the person's hands;
connecting the left-hand conductive glove to a control device which controls the electric drive of the machine;
connecting the right-hand conductive glove to the control device;
detecting a first resistance between the left-hand conductive glove and the right-hand conductive glove;
comparing the first resistance with a predetermined minimum resistance and a predetermined maximum resistance, wherein the predetermined minimum resistance is greater than 0Ω and less than a typical body resistance of a person, and wherein the predetermined maximum resistance is higher than the typical body resistance of a person;
activating an operating condition only if the first resistance is greater than the minimum resistance and less than the maximum resistance;
equipping the person with a left-hand insulating glove and a right-hand insulating glove which comprise an electrical insulator, and which are to be worn by the person over the conductive gloves before activating the operating condition;
wherein the operating condition includes supplying the electric drive with power by the control device and monitoring a voltage between the right-hand conductive glove and the left-hand conductive glove and switching off of the electric drive or reversing a direction of movement of the electric drive if the voltage changes between the right-hand conductive glove and the left-hand conductive glove.

15. Method according to claim 14, wherein before activation of the operating condition of the electric drive a resistance test device of the control device must perform a glove test function,
wherein second resistance between the left-hand conductive glove and a metallic part of the machine is compared with a predetermined glove maximum resistance if the person is wearing the left-hand glove and uses this gloved left hand to make contact with the metallic part;
wherein a third resistance between the right-hand conductive glove and the metallic part of the machine is compared with the predetermined glove maximum resistance if the person is wearing the right-hand glove and uses this gloved right hand to make contact with the metallic part;
and wherein the activation of the operating condition is prevented if the second or third resistance is greater than the predetermined glove maximum resistance.

16. Method according to claim 14, wherein in the operating condition, the resistance between the left-hand conductive glove and the right-hand conductive glove is periodically compared with the predetermined minimum resistance and the predetermined maximum resistance, and that the operating condition is terminated if the resistance is less than the minimum resistance or greater than the maximum resistance.

17. Method according to claim 16, wherein upon terminating the operating condition the control device interrupts the power supply of the electric drive.

18. Method according to claim 14, wherein the control device uses a voltage source to supply the left-hand and right-hand conductive gloves with direct current.

19. Method according to claim 18, wherein the direct current is cycled to alternately supply the left-hand and right-hand conductive gloves with direct current.

20. Method according to claim 18, wherein the direct current is cycled to supply the left-hand and right-hand conductive gloves with direct current at the same time.

21. Method according to claim 14, wherein faults detected by the control device are displayed on a display device.

22. Device according to claim 1, wherein the machine comprises a flaying and skinning machine with a knife, and a roller driven by the electric drive.

23. Device according to claim 1, wherein the machine comprises a membrane skinning machine with a knife, and a roller driven by the electric drive.

24. Method as in claim 14, wherein the method is implemented in a flaying and skinning machine.

25. Method as in claim 14, wherein the method is implemented in a membrane skinning machine.

* * * * *